United States Patent [19]
Nishimura et al.

[11] Patent Number: 4,883,529
[45] Date of Patent: Nov. 28, 1989

[54] CIRCULAR TUBE SHAPING APPARATUS

[75] Inventors: Hiroshi Nishimura; Satoshi Tanaka, both of Kanagawa, Japan

[73] Assignee: Kabushiki Kaisha Toshiba, Kawasaki, Japan

[21] Appl. No.: 236,728

[22] Filed: Aug. 26, 1988

[30] Foreign Application Priority Data

Aug. 27, 1987 [JP] Japan .................. 62-213535
Jun. 30, 1988 [JP] Japan .................. 63-106772

[51] Int. Cl.$^4$ .................................. C03B 23/06
[52] U.S. Cl. ........................... 65/281; 65/54; 65/108; 65/110; 65/276; 65/280
[58] Field of Search ............... 65/54, 55, 108, 110, 65/276, 280, 281, 286

[56] References Cited

U.S. PATENT DOCUMENTS 2,494,871 1/1950 Greiner ........................ 65/281
3,046,699 7/1962 Desty et al. .................. 65/108

FOREIGN PATENT DOCUMENTS 578770 of 0000 Japan .
5462213 of 0000 Japan .

Primary Examiner—Arthur Kellogg
Attorney, Agent, or Firm—Oblon, Spivak, McClelland, Maier & Neustadt

[57] ABSTRACT

An apparatus for shaping a tube into circle includes a dummy rod to be engaged to a rear end of the tube for constituting an extention of the tube and a support for supporting the combination of the tube and the dummy rod so that the combination is movable toward the front end of the tube. The support initially supports the tube section of the combination and finally supports the dummy rod section of the combination. A heater is located in front of the support for locally softening the tube. A turning arm is coupled at its free end to the front end of the tube for pulling the tube along a circle around the axis of the other end of the turning arm so that the tube is shaped into a circle defined by the turning movement of the turning arm. A motor moves the combination ahead.

3 Claims, 3 Drawing Sheets

CIRCULAR TUBE SHAPING APPARATUS

FIELD OF THE INVENTION

The present invention relates generally to an apparatus for shaping an elongated tube into circle, and more particularly, to an apparatus for shaping an elongated glass tube into a circular glass tube.

BACKGROUND OF THE INVENTION

Circular tubes have been used in many fields. For example, circular glass tubes have been used for electric lamps such as a fluorescent lamp or for electric heaters. Similarly, circular plastic tubes have been used in industrial machinery and tools. The circular tubes are generally shaped from elongated tubes.

Conventionally, an apparatus for shaping an elongated tube, e.g., an elongated glass tube, into circle has used a shaping drum. The shaping drum is formed with a round groove corresponding to the thickness of the elongated tube.

In a shaping process according to the conventional apparatus, a whole length of an elongated glass tube is initially softened by heat. The elongated glass tube thus softened is wound around the shaping drum. Thus, a circular glass tube is obtained.

The conventional apparatus requires a large scale furnace for first heating the whole length of the elongated glass tube. The elongate glass tube softened by the furnace has to be wound around the shaping drum very quickly. Thus, the apparatus is high in cost and the shaping operation of the glass tube is very difficult. Further, a plurality of shaping drums with different diameters must be prepared for manufacturing circular glass tubes with different diameters.

To eliminate the drawbacks of the above conventional apparatus, another conventional apparatus comprising a turning arm, as shown in the Japanese Patent; Tokko-sho P57-8770 issued on Feb. 18, 1982, has been developed. Now, the second conventional circular glass tube shaping apparatus and a circular glass tube shaping process according to the apparatus will be explained in reference to FIGS. 1 and 2. FIGS. 1 and 2 are elevations schematically showing the second conventional circular glass tube shaping apparatus in which an elongated glass tube is initially set to the apparatus and the glass tube is finally shaped into circle by the apparatus, respectively.

As shown in FIGS. 1 and 2, the conventional circular glass tube shaping apparatus comprises a front support 10, a rear support 11, a heater 12, a turning arm 13 and a turn drive motor 14 for driving an elongated glass tube 15a to be shaped into a circle. The front support 10 and the rear support 11 support the front and the rear of the elongated glass tube 15a i.e., the rightward portion and the leftward portion of the elongated glass tube 15a in the drawing, respectively.

The front support 10 is mounted at a fixed position in the apparatus and allows the elongated glass tube 15a to slide along its axis in the rightward direction. The rear support 11 is movably mounted in the apparatus so that the rear end of the elongated glass tube 15a is always supported thereby during movement. The rear support 11 has a rear chuck 16 for holding the rear end of the glass tube 15. The heater 12 locally heats a portion of the glass tube 15a ahead of the front support 10. The heater 12 is constituted by, e.g., a gas burner, an electric heater, a laser heater and etc. The turning arm 13 has a front chuck 17 on its free end. The front chuck 17 holds the front end of the glass tube 15 ahead of the heater 12. The turn drive motor 14 turns the turning arm 13 around an axis 18 on the othe rend of the turning arm 13 in the clockwise direction in the drawing.

The elongated glass tube 15a is cut to a given length Lp corresponding to a circular length of a resulted circular glass tube 15b (see FIG. 2), prior the elongated glass tube 15a being set in the apparatus.

When the elongated glass tube 15a is set in the apparatus, as shown in FIG. 1, the heater 12 starts to locally heat a portion of the glass tube 15a near the front support 10. The turn drive motor 14 turns the turning arm 13 in the clockwise direction when the locally heated portion of the glass tube 15a is softened. Thus, the front chuck 17 of the turning arm 13 pulls the glass tube 15 rightward during its clockwise circular motion. The heat softened portion of the glass tube 15 is bent in response to the circular motion of the turning arm 13 and then hardened. The circular motion of the turning arm 13 ends when the turning arm 13 has turned by a given angle $\theta 1$ in which the front chuck 17 is prevented from further circular motion by the front support 10 or the rear support 11 (see FIG. 2). As a result, the rear of the circular glass tube 15b thus shaped is left straight.

As explained above, the conventional circulr glass tube shaping apparatuss can not shape the whole length of the elongated glass tube 15a into a circle. Thus, the resulting circular glass tube 15b is unattractive.

If it is desired to improve the appearance of the resulting circulr glass tube 15b, the straight rear portion is cut out after the shaping process. The elongate glass tube 15a must then be initially cut to an extended length Le which is longer than the given length Lp by a predetermined surplus length Ls corresponding to the rear portion of the glass tube 15 left straight at the end of the shaping process, prior the elongated glass tube 15a being set in the apparatus. The three lengths have a relation Le=Lp+Ls. In this case, the circular glass tube shaping process requires the extra process for trimming the straight rear portion. The straight rear portion thus trimmed is wasted. In addition, the diameter of the circular glass tube 15b becomes large as compared to the former case where the straight rear portion is left as the part of the resulting circular glass tube 15b.

SUMMARY OF THE INVENTION

It is, therefore, an object of the present invention to provide a circular tube shaping apparatus in which a whole length of an elongated tube is easily shaped into a circle.

Another object of the present invention is to provide a circular tube shaping apparatus which is able to produce an attractive circular tube.

A further object of the present invention is to provide a circular tube shaping apparatus which is able to produce a circular tube with a reduced diameter.

In order to achieve the above object, a circular tube shaping apparatus according to one aspect of the present invention includes a dummy rod to be engaged to a rear end of the tube for constituting an extension of the tube, a support for supporting the combination of the tube and the dummy rod so that the combination is movable toward the front end of the tube, the support initially supporting the tube section of the combination and finally supporting the dummy rod section of the combination, a heater located in front of the support for locally softening the tube, a turning arm to be coupled at its free end to the front end of the tube for pulling the tube along a circle around the axis of the other end of the turning arm so tht the tube is shaped into a circle defined by the turning movement of the turning arm and a motor for moving the combination ahead.

Additional objects and advantages of the present invention will be apparent to persons skilled in the art from study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
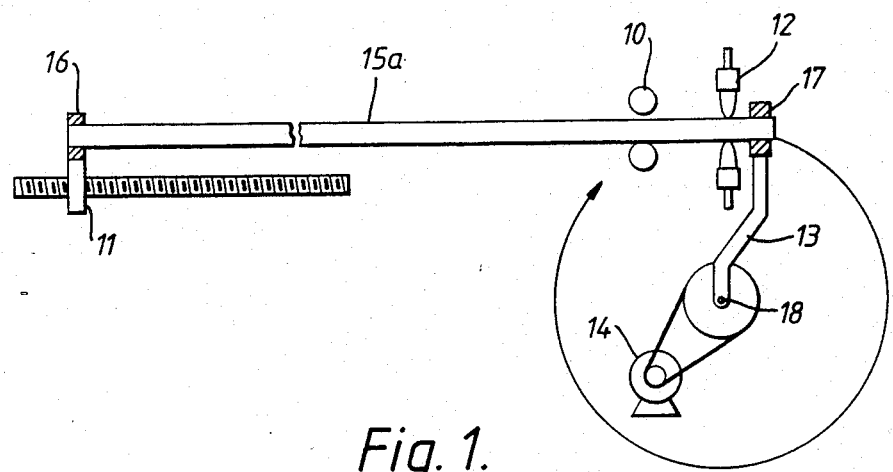
FIG. 1 is an elevation view schematically showing a conventional circular glass tube shaping apparatus in which an elongated glass tube is initially set to the apparatus.
Figure 2:
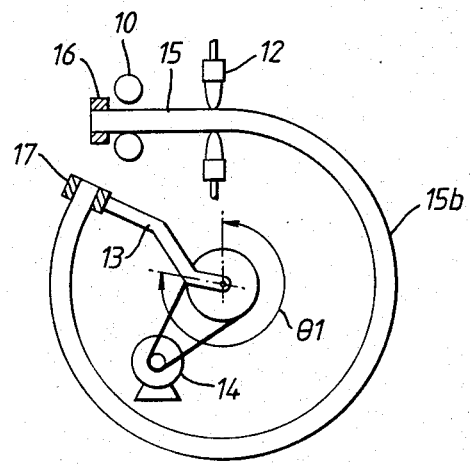
FIG. 2 is an elevation view showing the apparatus of FIG. 1 in which an elongated glass tube is finally shaped into circle by the apparatus.

The present invention will be described in detail with reference to the FIGS. 3 through 7. Throughout drawings, reference numerals or letters used in FIGS. 1 and 2 will be used to designate like or equivalent elements for simplicity of explanation.

Figure 3:
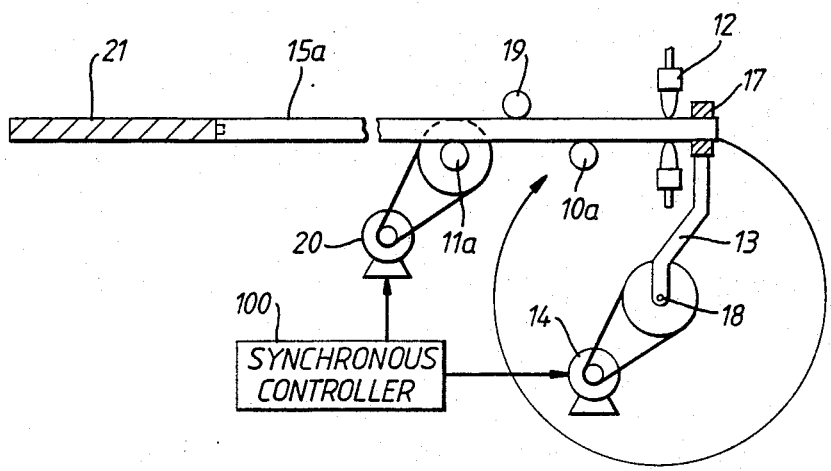
FIG. 3 is an elevation view schematically showing a first embodiment of the circular glass tube shaping apparatus according to the present invention in which an elongated glass tube is initially set to the apparatus.
Figure 4:
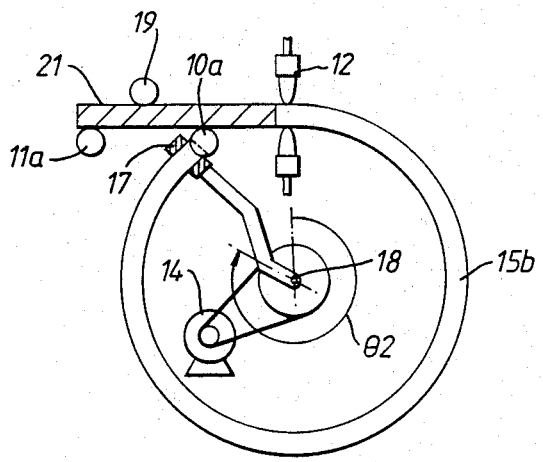
FIG. 4 is an elevation view showing the first embodiment of FIG. 3 in which an elongated glass tube is finally shaped into circle by the apparatus.

Referring now to FIGS. 3 and 4, a first embodiment of the circular glass tube shaping apparatus according to the present invention will be described in detail. FIGS. 3 and 4 are elevation views of the first embodiment of the circular glass tube shaping apparatus in which an elongated glass tube is initially set to the apparatus and the glass tube is finally shaped into circle by the apparatus, respectively.

As shown in FIGS. 3 and 4, the first embodiment of the circular glass tube shaping apparatus comprises a front support roller 10a, a rear support roller 11a, a bias roller 19, a heater 12, a turning arm 13 and a turn drive motor 14 for driving an elongated glass tube 15a to be shaped into circle. The front support roller 10a and the rear support glass tube 15ai.e., the rightward portion and the leftward portion of the elongated glass tube 15a in the drawing, respectively. The bias roller 19 presses the elongated glass tube 15 against the front support roller 10a and the rear support roller 11a at a position between the rollers 10a and 11a. Thus, the elongated glass tube 15 is stably supported among the rollers 10a, 11a and 19. One of the three rollers 10a, 11a and 19, e.g., the rear support roller 11a is driven by a feed drive motor 20. Thus, the elongated glass tube 15a is fed rightward in the drawing, when the feed drive motor 20 is activated. The feed drive motor 20 is operated in synchronous with the turn drive motor 14 by a synchronous controller 100 coupled to both the feed drive motor 20 and the turn drive motor 14.

The three rollers, i.e., the front support roller 10a, the rear support roller 11a and the bias roller 19 are mounted triangularly in the apparatus and allow the elongated glass tube 15a to slide along its axis in the rightward direction.

The heater 12 locally heats a portion of the glass tube 15a ahead of the front support roller 10a. The heater 12 is constituted by, e.g., a gas burner, an electric heater, a laser heater, etc. The turning arm 13 has a front chuck 17 on its free end. The front chuck 17 holds the front end of the glass tube 15 ahead of the heater 12. The turn drive motor 14 turns the turning arm 13 around an axis 18 on the other end of the turning arm 13 in the clockwise direction in the drawing.

The elongated glass tube 15a is cut to a given length Lp corresponding to a circular length of a resulting circular glass tube 15b (see FIG. 4), prior the elongated glass tube 15a being set in the apparatus. Further, the first embodiment of the circular glass tube shaping apparatus includes a dummy rod 21 which has a thickness the same as the glass tube 15 and a predetermined length. The dummy rod is made of a heat resistant material such as metal or ceramic. The dummy rod 21 is secured to the rear end of the elongated glass tube 15a, prior the elongated glass tube 15a being set in the apparatus, as shown in FIG. 3.

When the elongated glass tube 15a is set in the apparatus, as shown in FIG. 3, the heater 12 starts to locally heat a portion of the glass tube 15a near the front support roller 10a. The turn drive motor 14 turns the turning arm 13 in the clockwise direction when the locally heated portion of the glass tube 15a is softened. Thus, the front chuck 17 of the turning arm 13 pulls the glass tube 15 rightward during its clockwise circular motion. The heat softened portion of the glass tube 15 is bent in response to the circular motion of the turing arm 13 and then hardened. The circualr motion of the turning arm 13 ends when the turning arm 13 has turned by a given angle $\theta 2$ in which the front chuck 17 is prevented from further circular motion by the front support roller 10a or the dummy rod 21, as shown in FIG. 4. Thus, FIG. 4 shows a final stage of the shaping process of the circular glass tube 15b.

The dummy rod 21 is slid together with the glass tube 15 by the feed drive motor 20. Thus, the dummy rod 21 advances to a position between the front support roller 10a and the rear support roller 11a when the circular clockwise motion of the turning arm 13 ends in the state that the turning arm 13 has turned by the given angle $\theta 2$ (see FIG. 4).

At the final stage of the circular glass tube shaping process, the rear end of the glass tube 15, which is secured to the dummy rod 21, reaches a position corresponding to the heater 12. Thus, the whole length of the glass tube 15 is shaped into the circle, as shown in FIG. 4. The dummy rod 21 is removed from the glass tube 15 after the circular glass tube 15b has been shaped. The dummy rod 21 is used repeatedly for the production of other circular glass tubes.

According to the first embodiment of the circular glass tube shaping apparatus, the dummy rod 21 suspends the rear end of the glass tube 15. Thus, the rear end of the glass tube 15 is allowed to reach the position corresponding to the heater 12. Thus, the whole length of the glass tube 15 is shaped into circle.

As the whole length of the glass tube 15 is shaped into circle, the diameter of the resulting circular glass tube 15b can be reduced in comparison to those which are shaped by the conventional apparatus and then trimmed straight portions left unshaped.

Figure 5:
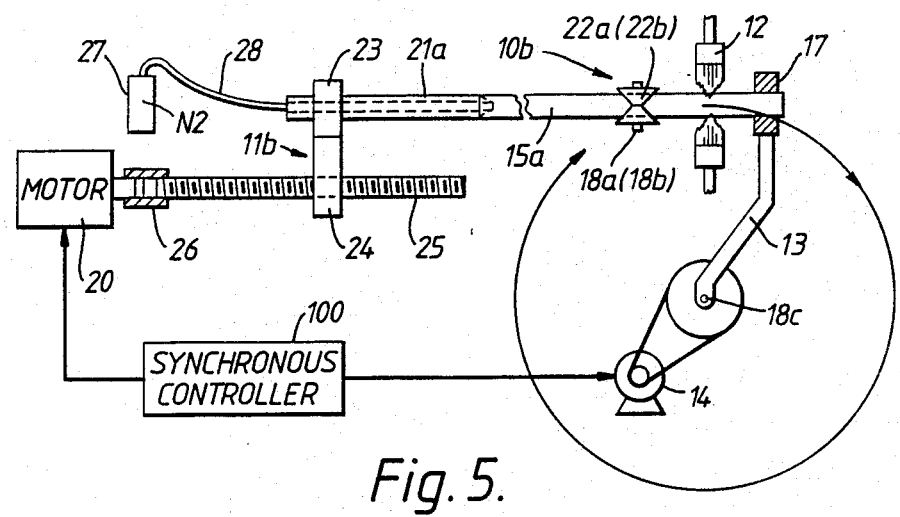
FIG. 5 is an elevation view schematically showing a second embodiment of the circular glss tube shaping apparatus according to the present invention in which an elongated glass tube is initially set to the apparatus.
Figure 6:
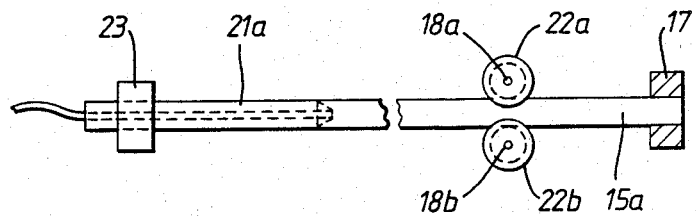
FIG. 6 is a plane view showing the second embodiment of FIG. 5.
Figure 7:
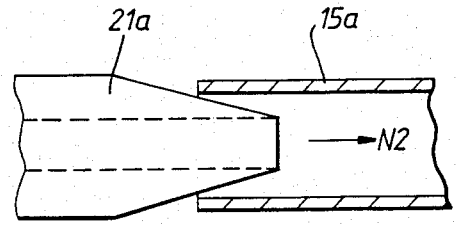
FIG. 7 is a section showing the nozzle and the glass tube of FIG. 5 engaged with each other.

Referring now to FIGS. 5, 6 and 7, a second embodiment of the circular glass tube shaping apparatus according to the present invention will be described in detail. FIG. 5 is an elevation view of the second embodiment of the circular glass tube shaping apparatus in which an elongated glass tube is initially set to the apparatus. FIG. 6 is a plan view of the apparatus of FIG. 5. FIG. 7 is a section showing the glass tube and the nozzle in FIG. 5, engaged to each other.

As shown in FIGS. 5 and 6, the second embodiment of the circular glass tube shaping apparatus comprises a front support 10b, a rear support 11b, a feed drive motor 20, a pipe nozzle 21a, a heater 12, a turning arm 13 and a turn drive motor 14. The pipe nozzle 21a is engaged to the rear end of an elongated glass tube 15a to be shaped, as shown in FIG. 7, when the elongated glass tube 15a is set in the apparatus. Thus, the rear end of the elongated glass tube 15a is supported by the rear support 11b through the pipe nozzle 21a. The front end of the pipe nozzle 21a is tapered, as shown in FIG. 7, so that the pipe nozzle 21a is easily engaged to the glass tube 15 or removed therefrom.

The front portion of the elongated glass tube 15a is supported by the front support 10b. The front support 10b is mounted at a fixed position in the apparatus and allows the elongated glass tube 15a to slide along its axis in the rightward direction in the drawing. The front support 10b comprises a pair of rollers 22a and 22b with a round groove or a V-shape groove. The rollers 22a, 22b movably hold the elongated glass tube 15a therebetween. Rotating axes 18a, 18b of the rollers 22a, 22b are perpendicular to a turning axis 18c of the turning arm 13, as described later.

The rear support 11b is movably mounted in the apparatus so that the pipe nozzle 21a engaged to the rear end of the elongted glass tube 15a is always supported thereby during movement. The rear support 11b comprises a bracket 23 and a ball bearing 24. The bracket 23 holds the pipe nozzle 21a, while the ball bearing 24 is engaged to a screw rod 25. The screw rod 25 is coupled to the feed drive motor 20 through a joint 26. Thus, the rear support 11b and the pipe nozzle 21a are driven rightward when the feed drive motor 20 is activted. The feed drive motor 20 is operated in synchronism with the turn drive motor 14 by a synchronous controller 100 coupled to both the feed drive motor 20 and the turn drive motor 14.

The heater 12 locally heats a portion of the glass tube 15a ahead of the front support 10b. The heater 12 is constituted by, e.g., a gas burner, an electric heater, a laser heater, etc, as described before. The turning arm 13 has a front chuck 17 on its free end. The front chuck 17 holds the front end of the glass tube 15 ahead of the heater 12. The turn drive motor 14 turns the turning arm 13 around the axis 18c at the other end of the turning arm 13 in the clockwise direction in the drawing.

The elongated glass tube 15a is cut to a given length Lp corresponding to a circular length of a resulting circular glass tube 15b, prior the elongated glass tube 15a being set in the apparatus. The pipe nozzle 21a has a thickness the same as the glass tube 15 and a predetermined length. The pipe nozzle 21a is engaged to the rear end of the elongated glass tube 15a, prior the elongated glass tube 15a being set in the apparatus, as described before.

When the elongated glass tube 15a is set in the apparatus, as shown in FIG. 5, the heater 12 starts to locally heat a portion of the glass tube 15a near the front support roller 10B. The turn drive motor 14 turns the turning arm 13 in the clockwise direction when the locally heated portion of the glass tube 15a is softened. Thus, the front chuck 17 of the turning arm 13 pulls the glass tube 15 rightward during its clockwise circular motion. The feed drive motor 20 also drives the rear support 11b through the screw rod 25, in synchronism with the turn drive motor 14. Thus, the rear support 11b pushes the glass tube 15 through the pipe nozzle 21a.

The pipe nozzle 21a is coupled to an inert gas source such as a nitrogen ($N_2$) gas cylinder 27 thorugh a hose 28. Nitrogen gas ($N_2$) is thus supplied from the gas cylinder 27. into the glass tube 15 through the pipe nozzle 21a. Nitrogen gas ($N_2$) prevents oxidation of the glass tube 15 by the heat for softening.

The heat softened portion of the glass tube 15 is bent in response to the circular motion of the turing arm 13 and then hardened after passing the heater 12. The circular motion of the turning arm 13 ends when the turning arm 13 has turned until the front chuck 17 is prevented from further circular motion by the front support 10b or the pipe nozzle 21a.

The pipe nozzle 21a is driven rightward, together with the glass tube 15 by the feed drive motor 20. Thus, the pipe nozzle 21a advances to a position between the front support 10b and the heater 12 when the circular clockwise motion of the turning arm 13 has fully turned, as described above.

At the final stage of the circular glass tube shaping process, the rear end of the glass tube 15, which is secured to the pipe nozzle 21a, reaches a position corresponding to the heater 12. Thus, the whole length of the glass tube 15 is shaped into the circle. The pipe nozzle 21a is removed from the glass tube 15 after the circular glass tube 15b has been shaped. The pipe nozzle 21a is used repeatedly for the production of other circular glass tubes.

According to the second embodiment of the circular glass tube shaping apparatus, the pipe nozzle 21a suspends the rear end of the glass tube 15. Thus, the rear end of the glass tube 15 is allowed to reach the position corresponding to the heater 12. Thus, the whole length of the glass tube 15 is shaped into circle. Further the circular glass tube 15b thus shaped is not oxidized.

Further, the axes 18a, 18b of the rollers 22a, 22b of the front support 10a are perpendicular to the axis 18c of the turning arm 13, as decribed before. Thus, the distance between the softened portion of the glass tube 15 and the turning axis, i.e., the axis 18c of the turning arm 13 is held constant, even though the thickness of the glass tube 15 varies. This reduces a variation of the diameter of the resulted circular glass tube 15a.

As the whole length of the glass tube 15 is shaped into circle, the diameter of the resulted circular glass tube 15b can be reduced in comparison to those which are shaped by the conventional apparatus and then trimmed straight portions left unshaped.

While there has been illustrated and described what are at present considered to be preferred embodiment of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central idea thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus for shaping a tube into circle, comprising:
    rod means releasably engageable to a rear end of the tube for extending the length of the tube, the rod means comprising a dummy extension of the tube positioned substantially coextensive with the tube;
    means for supporting and feeding a combination of the tube and the rod means for movement toward the front end of the tube, the supporting means comprising means for initially supporting only the tube of the combination and finally supporting only the rod means of the combination;
    means located ahead of the supporting means in a direction of movement of the combination for locally heat softening the tube;
    turning arm means having a free end rotatable about an axis, including means for coupling the turning arm means to the front end of the tube for pulling the tube along a circle around the axis, so that the tube is shaped into a circle defined by turning movement of the turning arm means; and
    means coupled to the means for supporting and feeding for moving said combination in synchronism with said turning arm means.

2. The apparatus of claim 1 wherein the moving means includes means coupled to the turning arm means for turning thereof said turning arm means.

3. The apparatus of claim 1 further comprising means for synchronizing operations of the turning arm means and the moving means.

* * * * *

UNITED STATES PATENT AND TRADEMARK OFFICE
CERTIFICATE OF CORRECTION

PATENT NO. : 4,883,529

DATED : Nov. 28, 1989

INVENTOR(S) : Hiroshi Nishimura, et al

It is certified that error appears in the above-identified patent and that said Letters Patent is hereby corrected as shown below:

On the title page:

The 2nd Foreign Application Priority Data is incorrectly recorded "Jun. 30, 1988 [JP] Japan........63-106772" should be:

--Jun. 30, 1988 [JP] Japan........63-160772--

Signed and Sealed this

Twentieth Day of November, 1990

Attest:

*Attesting Officer*

HARRY F. MANBECK, JR.

*Commissioner of Patents and Trademarks*